United States Patent [19]

Chen

[11] Patent Number: 5,158,011

[45] Date of Patent: Oct. 27, 1992

[54] GARLIC MEMBRANE PEELING MACHINE

[76] Inventor: Sung-Yuan Chen, No. 62, Chung-Cheng South Road, Yung-Kang Hsiang, Tainen Hsien, Taiwan

[21] Appl. No.: 858,655

[22] Filed: Mar. 27, 1992

[51] Int. Cl.⁵ .................. A23N 7/00; A23N 15/08
[52] U.S. Cl. .................... 99/584; 99/476; 99/483; 99/516; 99/534
[58] Field of Search ............... 99/473–476, 99/484, 485, 516, 534, 536, 584, 586, 623, 646 R; 426/481, 482

[56] References Cited

U.S. PATENT DOCUMENTS

| | | | |
|---|---|---|---|
| 3,543,824 | 12/1970 | Parsons | 99/516 |
| 4,222,322 | 9/1980 | Van Der Schoot | 99/483 |
| 4,300,447 | 11/1981 | Hoover | 99/516 |
| 4,401,019 | 8/1983 | Leonov et al. | 99/474 |
| 4,457,224 | 7/1984 | Kino | 426/482 |
| 4,569,850 | 2/1986 | Harris et al. | 426/482 |
| 4,718,334 | 1/1988 | Nagaoka | 99/546 |
| 4,977,826 | 12/1990 | Kock et al. | 99/516 |
| 4,998,465 | 3/1991 | Fischer et al. | 99/584 |
| 4,998,466 | 3/1991 | Nagaoka | 99/516 |
| 5,021,254 | 6/1991 | Fischer et al. | 99/584 |

FOREIGN PATENT DOCUMENTS 3534726  4/1987  Fed. Rep. of Germany ........ 99/584

Primary Examiner—Timothy F. Simone
Attorney, Agent, or Firm—Morton J. Rosenberg; David I. Klein

[57] ABSTRACT

A garlic membrane peeling machine comprising a store tank, a drying funnel, a membrane peeling cylinder, a hot air tube connected with a blower and a push device combined together. The store tank is mounted on the drying funnel, under which the membrane peeling cylider is connected, and the push device is set partly in the drying funnel and partly in the membrane peeling cylinder. The hot air tube is connected with the double-layered wall of the drying funnel to send hot air through an aperture between the double-layered wall in the funnel to dry the garlic bulbs coming down from the store tank. Then dried garlic bulbs are loosened by the push device to fall down in the membrane peeling cylinder to have their membranes peeled off by helical air current caused by sent-in compressed air and those membranes peeled off are blown out of an exhaust tube.

6 Claims, 5 Drawing Sheets

GARLIC MEMBRANE PEELING MACHINE

BACKGROUND OF THE INVENTION

Garlic is widely used as a healthful food and a medicine for curing some diseases these days. Before it is used or eaten, its membrane has to be peeled off, but the work has been done by manual operation and workers have been obliged to endure the especially biting smell of garlic.

This invention has been devised to furnish a kind of garlic membrane peeling machine to automatically peeling its membrane.

SUMMARY OF THE INVENTION

The garlic membrane peeling machine in the present invention comprises a store tank, a drying funnel connected with the bottom end of the store tank, a membrane peeling cylinder connected with the bottom end of the drying funnel, a hot air tube connected at one end with the wall of the drying funnel and at the other end with a blower, and a push device set partly in the drying funnel and partly in the membrane peeling cylinder, as the main components.

The store tank has a round lid at the top for pouring raw garlic bulbs therein by opening the lid, which has an exhaust tube for air passage. Its bottom end is connected with the upper end of the drying funnel by means of hinges.

The drying funnel has a bottom flange connected with the top end of the membrane peeling cylinder and a cone-shaped guider is hung on a stabilizing rod stretched across the top of the said cylinder. The cone-shaped guider has a plurality of through holes for the hot air coming from the hot air tube to pass through so that the garlic bulbs in the drying funnel can be dried by the hot air.

The membrane peeling cylinder has its top end connected with the bottom flange of the drying funnel for receiving dried garlic bulbs coming down from said funnel and to peel membranes off garlic bulbs by helical air current caused by guided-in compressed air through a plurality of nozzle valves provided in the lower wall of said cylinder. Peeled membranes are blown out of an exhaust tube provided in the cylinder wall.

The push device set partly in the drying funnel and partly in the membrane peeling cylinder consists of a pressure cylinder with a piston rod, a cone-shaped lid, a worm, a push rod and a silicon rubber disc, for pushing up and down the garlic bulbs dried in the drying funnel to move gradually down in the membrane peeling cylinder. The pressure cylinder has its top end held stabilized vertically by two support rods horizontally held by two vertical stabilizing rods extending down from the bottom flange of the funnel. The piston rod of the pressure cylinder extends upward and has its top end welded with the lower end of the worm. A cone-shaped lid is combined at the lower end of the worm so as to close or open the bottom exit of the funnel. At the top of the worm is combined a push rod to push up and down the garlic bulbs in the funnel to move down. And a silicon rubber disc is adjustably combined with the worm under the push rod so as to adjust the quantity of garlic bulbs in the funnel. The piston rod can be moved up and down so that the cone-shaped lid, the silicon rubber disc and the push rod can be moved up and down to move the garlic bulbs in the funnel to fall down in the peeling cylinder.

BRIEF DESCRIPTION OF THE DRAWINGS

FIG. 3-1 is a perspective view of the blocking plate in the present invention.

DETAILED DESCRIPTION OF THE INVENTION

Figure 1:
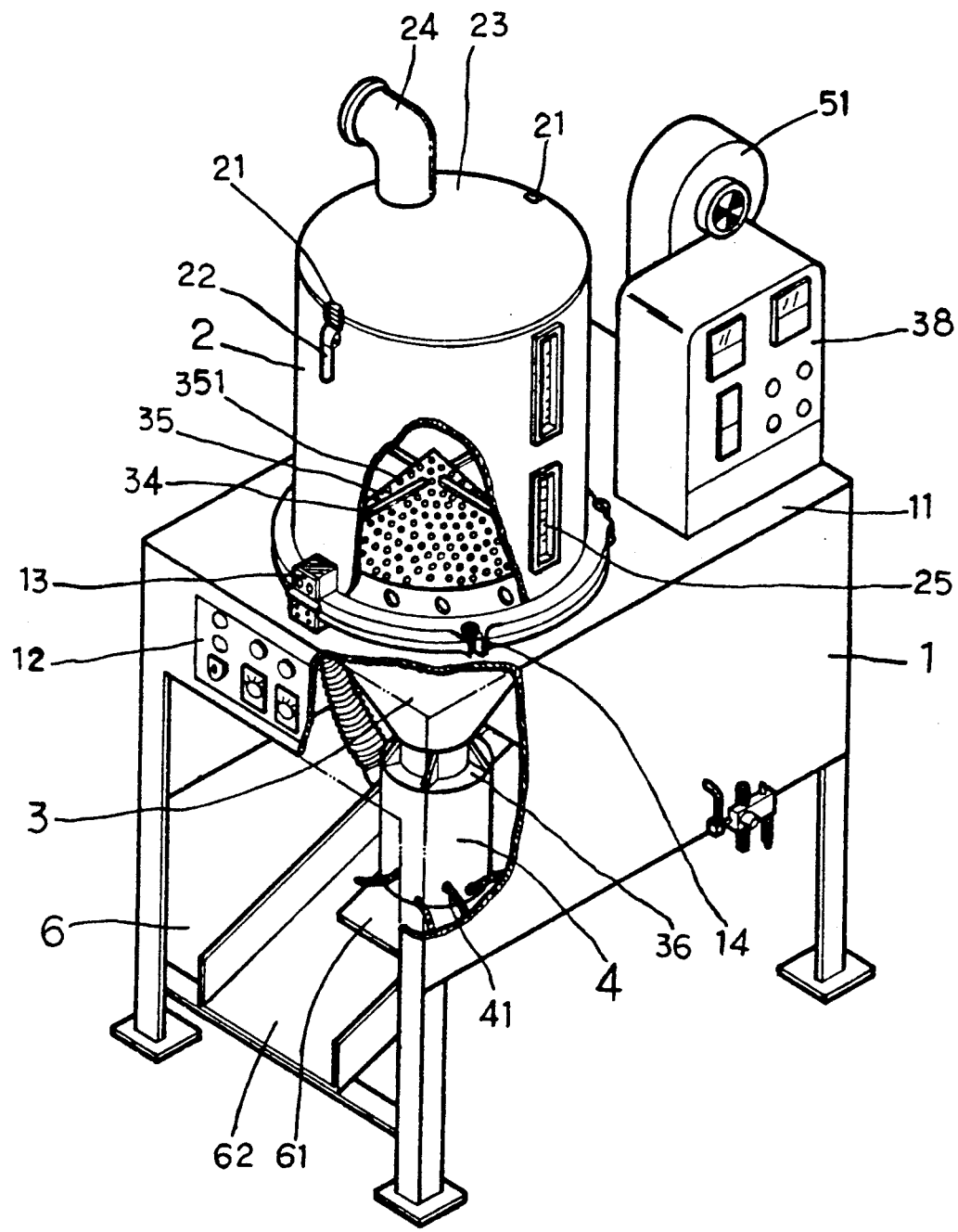
FIG. 1 is a perspective view of the garlic membrane peeling machine in the present invention.
Figure 2:
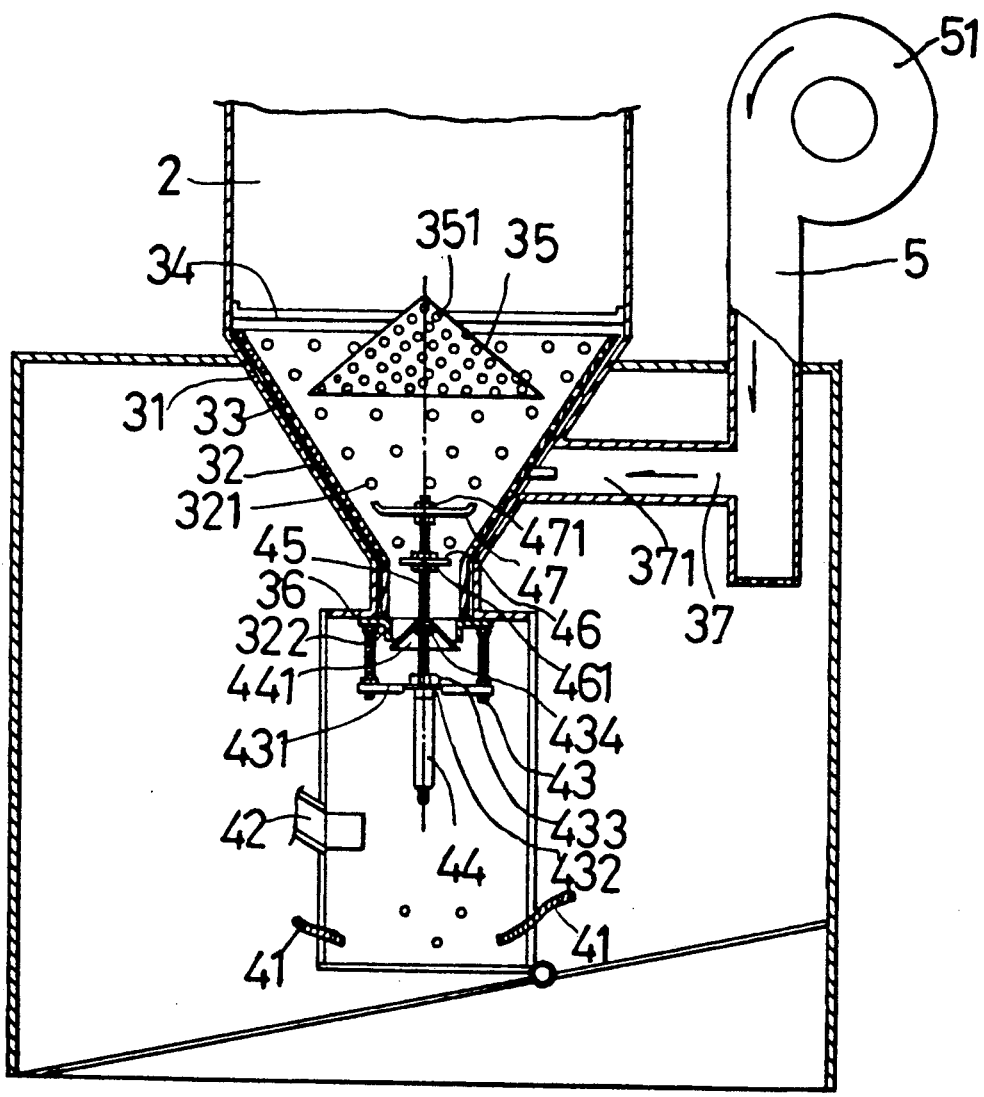
FIG. 2 is a cross-sectional view of the garlic membrane peeling machine in the present invention.
Figures 1, 3:
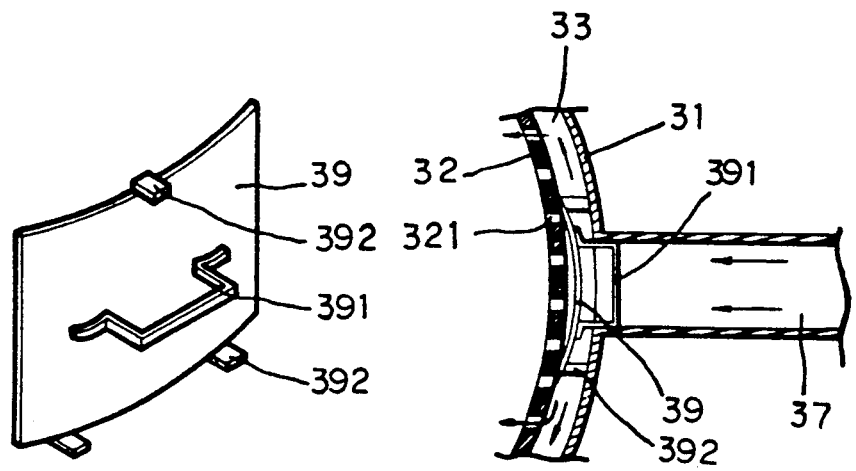
FIG. 3 is a cross-sectional view of the flowing of the hot air in this machine.

The garlic membrane peeling machine in the present invention, as shown in FIGS. 1 and 2, comprises a table 1, a store tank 2, a drying funnel 3, a membrane peeling cylinder 4, a blower tube 5 and a transporting-out device 6 as the main components.

The table 1 has a flat surface board 11 at the top for mounting the store tank 2, a blower tube 5 and a control plate 12 at the front end, a hole in the flat surface board 11 for the drying funnel 3 to fit in. The upper end of the drying funnel 3 is assembled stably with the store tank 2 by means of hinges 13 and screws inserting through holes in the flanges of the store tank 2 and the drying funnel 3 and screwing in the flat board 11.

The store tank 2 has a round lid 23 secured at the top by means of two hinges 21 and two toggle clamps 22. An exhaust tube 24 is fixed at the lid 23, and a looking window 25 is provided at the side wall of the store tank 2 to check the quantity of the garlic bulbs and the working condition therein.

The drying funnel 3 is shaped as a funnel having an outer layer 31 and an inner layer 32 provided with a plurality of small through hole 321. Between the inner layer 32 and the outer layer 31 is provided an aperture 33 for hot air to pass through and then through the small holes 321 into the interior of the funnel 3. A cone-shaped guider 35 having a plurality of small through holes 351 is hung on a stabilizing rod 34 set at the assembled line of both the store tank 2 and the drying funnel 3.

A hot air tube 37 is connected at one end with a blower tube 5 extending out of a blower 51 and at the other end with the side wall of the outer layer 32 of the drying funnel 3 so that the hot air can be blown in the drying funnel 3. Additionally, a thermometer 371 is set extending in the hot air tubes 37 through its wall, and a temperature controller 38 is mounted at the front end of the blower 51 to adjust the temperature of the hot air.

The membrane peeling cylinder 4 has its top end connected with the flange 36 of the drying funnel 3, provided with a plurality of nozzle tubes 41 inserting through its lower wall and an exhaust tube 42 at a proper place in its wall for garlic membranes peeled to be blown through out. Two stabilizing vertical rods 43 are fixed at the flange 36 of the drying funnel 3, extending down in the interior of said cylinder 4, and two support rods 431 are fixed sidewise at the lower end of said rod 43, welded with a stabilizing block 432 between them. A pressure cylinder 44 is combined with the block 432, having its top end of the piston rod passing through said block 432 and screwed with a nut 433 and through a cone-shaped lid 441 with a nut 434.

A worm 45 is set on the top end of the cone-shaped lid 441 extending upward into the drying funnel 3 and a silicon rubber ring 322 is provided at the bottom end of the inner layer 32 for the cone-shaped lid 441 to fit in to stop garlic bulbs in the drying funnel 3 from falling down, if said lid 441 is raised up by the movement of the piston rod of the pressure cylinder 44. The ring 322 can protect the garlic bulbs from being hurt, too. And a silicon rubber plate 46 is horizontally combined with the worm 45 by means of a nut 461 at a proper height of the worm 45 so as to adjust the quantity of the garlic bulbs in the drying funnel 3. In addition, at the top end of the worm 45 is combined a push rod 47 by means of a nut 471 so that the push rod 47 may be pushed up and down by reciprocation of the piston rod of the pressure cylinder 44 to loosen the piled up heap of dried garlic bulbs in the drying funnel 3 so as to let said bulbs move down in the membrane peeling cylinder 4, therein the garlic bulbs can be blown by helical air current to peel outer dried membranes off the bulbs, and the peeled off membranes are exhausted through an exhaust tube 42 by the helical air current. The peeled garlic bulbs are temporarily accumulated on the bottom plate 61, which can be moved open to drop the dried peeled garlic bulbs on a transporting inclined board 62.

Now, the action and function of this machine is to be described. After raw garlic bulbs are poured in the store tank 2, they pass by along the cone-shaped guider 35 into the drying funnel 3, temporarily staying therein to be dried by the hot air coming from the blower 51, as the bottom exit of the drying funnel 3 is blocked by the cone-shaped lid 441. The exit of the hot air tube 37 is provided with a blocking plate 39 having an U-shaped handle 391 to stick tensely in the hot air tube 37, and several projections 392 at the upper and the lower edge so that the plate 39 can be stabilized in the aperture between the outer and the inner layer 31 and 32 so that the hot air can be spread by the plate 39 to enter dispersingly the drying funnel 3.

Figure 4:
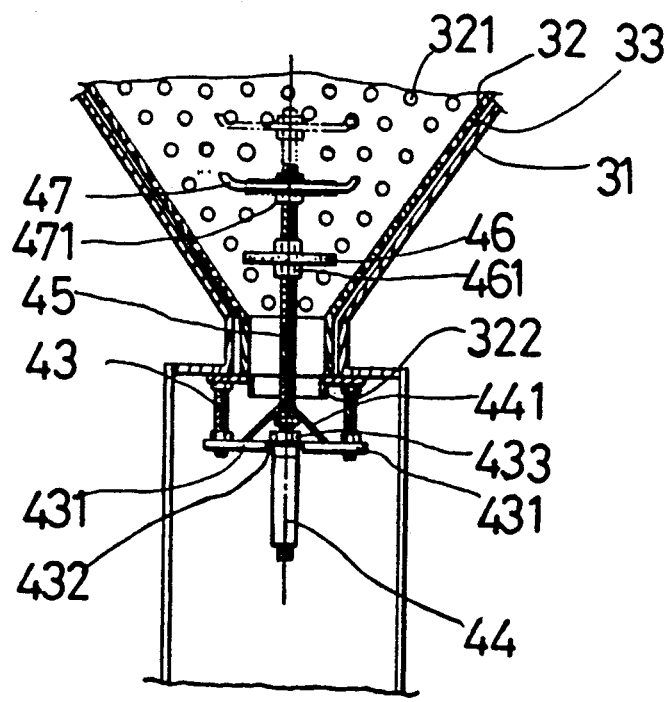
FIG. 4 is an actional view of the push rod in this invention.

When the garlic bulbs in the drying funnel 3 have been dried, the pressure cylinder 44 is operated to pull its piston rod down to pull the cone-shaped lid 434 down leaving the bottom exit of the drying funnel 3 as shown in FIG. 4 so that the dried garlic bulbs may fall down in the membrane peeling cylinder 4 and at the same time the push rod 47 at the top of the worm 45 can be moved up and down to loosen the garlic heap in the drying funnel 3 to move down in the cylinder 4.

Figure 5:
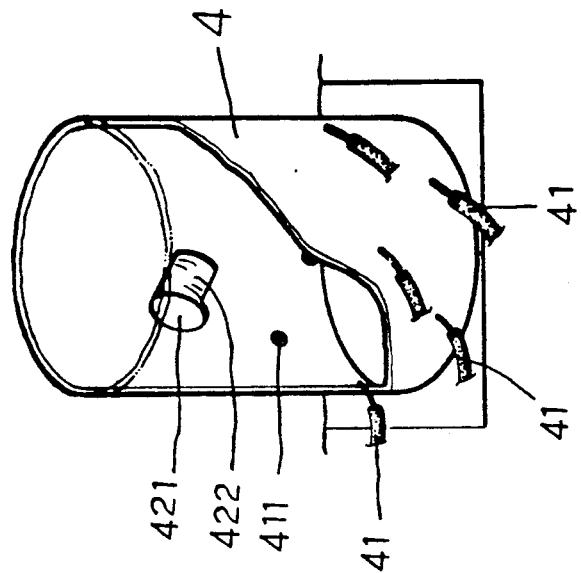
FIG. 5 is a cross-sectional view of the membrane peeling cylinder in the present invention.
Figure 6:
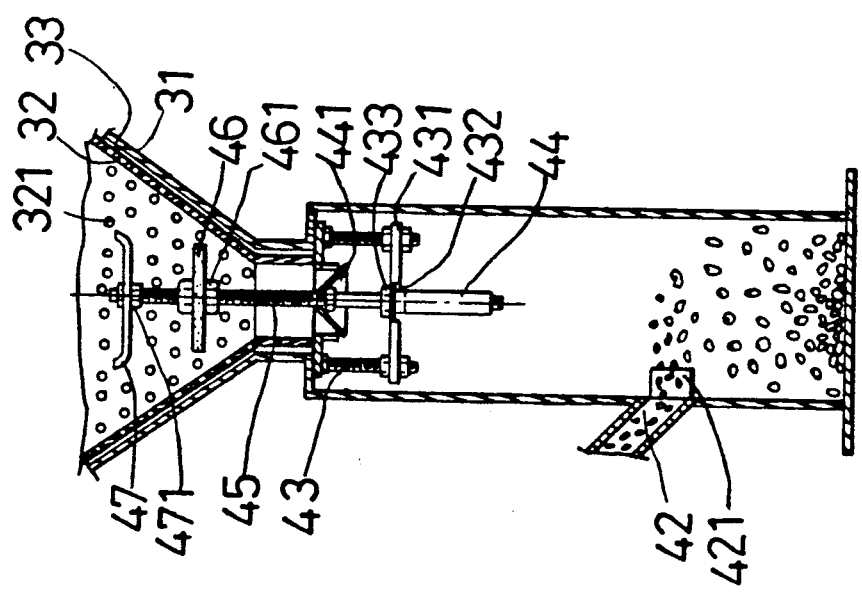
FIG. 6 is a cross-sectional view of the membranes peeled in the membrane peeling cylinder in the present invention.
Figure 7:
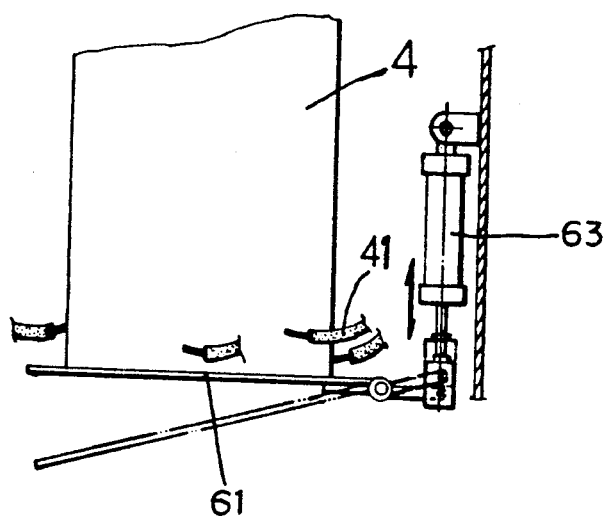
FIG. 7 is a perspective view of the finished product being transported out of the membrane peeling cylinder in the present invention.

The membrane peeling cylinder 4 is provided with a plurality of nozzle valves 411 properly spaced apart in the lower circumferential wall as shown in FIG. 5. Thus, compressed air coming from a compressor can be sent through the nozzle valves 411 connected with nozzle tubes 41 and the compressed air can become helical air current in the cylinder 4 so that the garlic bulbs therein may be forced to roll and rub against one another as shown in FIG. 6 so that the dried garlic membranes can be peeled off automatically and be exhausted out of the mouth 421 of the exhaust tube 42, which has a curved guide plate 422 to guide the membrane bits out of the tube 42. Then peeled garlic bulbs are accumulated temporarily on the bottom plate 61, which can be moved open by a pressure cylinder 63 and make said garlic bulbs to fall down on the transporting inclined board 62, and the whole automatic peeling precess is thus completed.

In the end, the advantages of this machine is listed as below.

1. It automatically completes the processes of pouring in raw garlic bulbs, drying, peeling their membranes and transporting out with little breaking percentage and high efficiency.

2. It has a compact dimension and convenience for transportation.

3. It is operated all automatically with easy handling, and high productivity.

4. It has a concise structure, convenient for assemblage, easy for cleaning or repairing its interior.

5. It has a temperature control device for adjusting the drying temperature for peeling membranes.

6. Its structure can prevent garlic bulbs from crowding together to obstruct their smooth movement.

What is claimed is:

1. A garlic membrane peeling machine comprising:
   a store tank having a round lid combined with an exhaust tube for storing raw garlic bulbs;
   a drying funnel having its top connected with the bottom end of the store tank for drying raw garlic bulbs coming down from the store tank, having a cone-shaped guider at the upper section perforated with a plurality of through holes for hot air to pass through for drying the garlic bulbs in the funnel, and its side wall being connected with a hot air tube for hot air to enter the interior of the funnel, said funnel being provided with an outer layer and an inner layer, said outer layer and inner layer being separated with an aperture, said inner layer being perforated with a plurality of small holes for hot air to pass through;
   a hot air tube having its exit connected with the side wall of the outer layer of the funnel, a stopping plate being set at the exit in said aperture to stop and disperse the hot air coming through the hot air tube from a blower connected with the other end of the tube so that the hot air can flow dispersingly through the aperture between the outer and the inner layer and then through the small holes in the inner layer and finally in the interior of the funnel;
   a pushing device partly set in the funnel and partly in a membrane peeling cylinder for pushing loose dried garlic bulbs in the funnel to let them drop down in the membrane peeling cylinder; and
   a membrane peeling cylinder connected downward with the bottom end of the funnel for receiving dried garlic bulbs to be peeled its membranes therein and to temporarily stay until transported out as a finished product.

2. The garlic membrane peeling machine as claimed in claim wherein the cone-shaped guider is hung up at its place by a stabilizing rod fixed horizontally at the bottom of the store tank so that garlic bulbs can fall down through the space between the cone-shaped guider and the wall of the inner layer of the funnel.

3. The garlic membrane peeling machine as claimed in claim 1, Wherein the pushing device set partly in the drying funnel and partly in the membrane peeling cylinder comprises;

a pressure cylinder having its upper end fixed vertically under the exit of the drying funnel and its piston rod extending upward;

a cone-shaped lid fixed on the piston rod of the pressure cylinder for blocking or leaving a silicon rubber ring at the exit of the drying funnel for stopping or releasing garlic bulbs by movement of the piston rod, said silicon rubber ring being possible to protect the garlic bulbs from being hurt;

worm having its bottom end welded with the top end of the piston rod, its top end combined with a horizontal push rod with a nut and its middle combined with a horizontal silicon rubber disc adjustably with a nut, said push rod being possible to loosen the garlic bulbs in the drying funnel to let them move down into the membrane peeling cylinder by movement of the piston rod; and said silicon rubber disc possible to be adjusted in its location on the worm so as to -change the quantity of garlic bulbs stored in the funnel.

4. The garlic membrane peeling machine as claimed in claim wherein a curved blocking plate at the exit of the hot air tube is provided with an U-shaped handle to stick in the hot air tube and with a plurality of sidewise projections properly spaced apart to lie crosswide in the aperture between the inner and the outer layer of the funnel such that the blocking plate can be held in the aperture to block and disperse the hot air through said aperture and small holes in the inner layer and finally into the funnel for drying the garlic bulbs.

5. The garlic membrane peeling machine as claimed in claim 1, wherein the membrane peeling cylinder is provided with a plurality of nozzle valves passing inclinedly through the lower wall and spaced apart at different height, and said nozzle valves are gradually tapered to the tips so that the compressed air going through them can become strong helical air current circling around in said cylinder to force the garlic bulbs therein to roll and rub against one another and thus to make the dried garlic membranes peeled off the bulbs by the strong air current.

6. The garlic membrane peeling cylinder as claimed in claim 1, wherein an exhaust tube for garlic membrane to go out provided in the wall of the membrane peeling cylinder has a curved guide plate plate to guide small pieces of garlic membranes to be blown out of the exhaust tube.

* * * * *